R. H. HOLMAN AND J. MacGREGOR.
SEARCHLIGHT.
APPLICATION FILED JULY 5, 1917.
1,382,728.
Patented June 28, 1921.
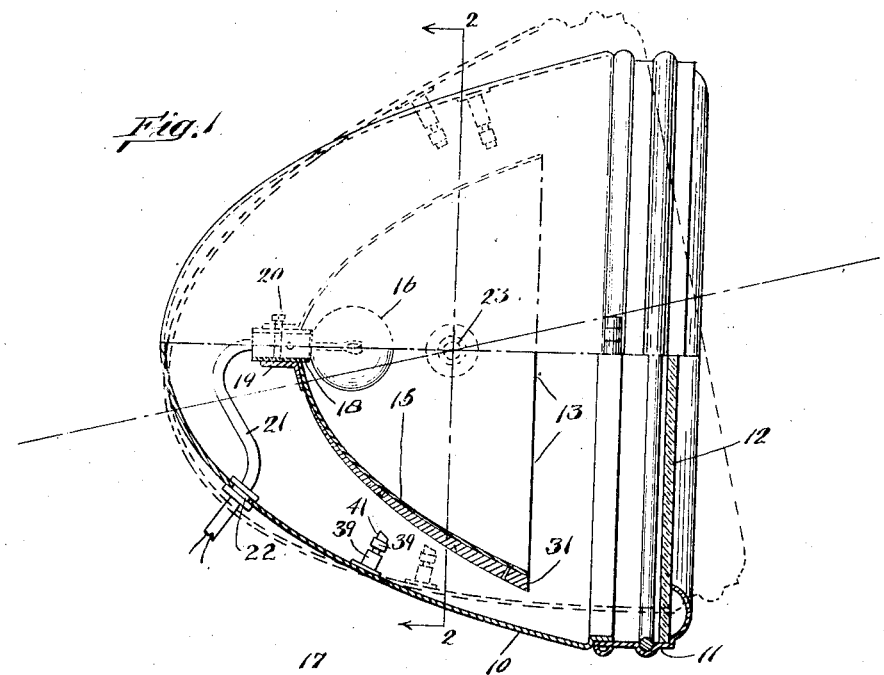
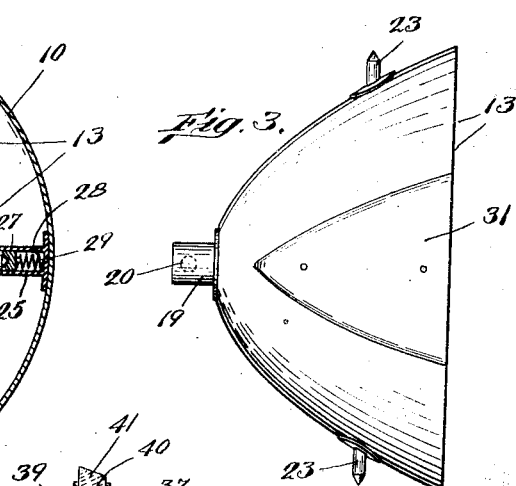
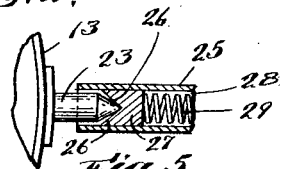
Inventor.
Ralph H. Holman
and
John MacGregor
by C. J. Noyes atty

UNITED STATES PATENT OFFICE.

RALPH H. HOLMAN, OF STONEHAM, AND JOHN MacGREGOR, OF ROSLINDALE, MASSACHUSETTS.

SEARCHLIGHT.

1,382,728. Specification of Letters Patent. Patented June 28, 1921.

Application filed July 5, 1917. Serial No. 178,537.

*To all whom it may concern:*

Be it known that we, RALPH H. HOLMAN and JOHN MACGREGOR, citizens of the United States, and residents, respectively, of Stoneham, in the county of Middlesex, and Roslindale, in the county of Suffolk, and State of Massachusetts, have invented an Improvement in Searchlights, of which the following is a specification.

Our invention relates to search lights and has specific reference to means whereby the rays of light issuing therefrom may be automatically controlled.

When a search light is employed on a vehicle, such as an automobile, car or other conveyance, for instance, and the conveyance is on a smooth level road or way, it is a comparatively simple matter to so control the light rays issuing from the search or head light that the driver in an approaching vehicle is not seriously inconvenienced by the rays; and the means commonly employed to control the light rays is to so bend or deflect the upwardly inclined rays that they are projected in a direction parallel to the ground and so away from an oncoming driver, or to so weaken or disperse the upwardly inclined rays that they do not inconvenience the driver or other observer.

In practice, however, the smooth, level road or way is of extremely rare occurrence and when the vehicle is traveling at even a moderate rate of speed, the small depressions and projections in such apparently smooth, level way are sufficient to cause said vehicle to toss and sway, and to throw the otherwise parallel or downwardly inclined rays of light upward and into the eyes of the driver of an oncoming vehicle or a pedestrian, to cause him to be blinded thereby, with the result that an accident may occur. The tossing or swaying and pitching of the vehicle even though apparently small, and on an apparently smooth level road or way is so continual and of such magnitude, being enhanced by the leverage of the long beam of projected light, that the effect of the fixed control of the light rays, by bending the rays downward or by dispersion or other means, is nullified and the effect on the oncoming driver or observer is as though no attempt has been made to control the light rays. Inasmuch as the majority of ways traveled over by the average automobile or other conveyance are far from being the smooth level road or way cited as an illustration, it is evident that there is no instance wherein a moving vehicle can have the light from its search light effectually controlled by a fixed means.

If, however, the search light is so arranged that the beam of light projected therefrom is maintained in a horizontal plane regardless of any movement of the vehicle to a position above or below said plane, then the fixed light controlling means may be always effective in maintaining the rays of light below the horizontal plane and away from the eyes of the driver in an oncoming vehicle or other observer.

Consequently the object of our invention is to provide means associated with a search light on a vehicle or conveyance whereby the rays of light issuing from said search light are maintained in a predetermined direction regardless of a movement of said vehicle or conveyance.

The means by which we obtain the object of our invention is to provide the reflector of the head light with a pivotal connection with the shell of the head light or the support therefor, and so dispose said pivotal connection with respect to the mass of the reflector that the reflector tends to maintain its predetermined position regardless of a movement of the head light or vehicle to which the head light may be attached.

Figure 1 is a side elevation, partly in section of a head light embodying our invention.

Fig. 2 is a sectional view along line 2—2 of Fig. 1.

Fig. 3 is a plan view of the reflector showing the counterbalance weight.

Fig. 4 is a sectional view of an adjustable reflector limit stop.

Fig. 5 is a sectional detail of a pivotal bearing.

As here shown, the search, or head light includes the outer shell or casing 10 which may be secured in any convenient manner not necessarily shown, to an automobile or other vehicle or conveyance, and said shell is provided with a door 11 in which is secured a glass plate 12 through which the light from the search light is adapted to pass, as is common practice.

The reflector 13 is pivotally mounted within the shell 10 in bearings hereinafter to be described, disposed in diametrically opposite relation with respect to said reflector and so related to the center of mass of the reflector that the axis of the reflector tends to maintain a horizontal plane regardless of a movement of the searchlight.

The reflector may be of any suitable shape or form, parabolic or otherwise, and as here shown, is formed with that part 15 below the horizontal axis of a parabolic curve, by means of which the rays of light issuing from the incandescent filament of the electric light or bulb 16 adapted to be disposed somewhat to the rear of the focus of the said curve, are reflected in a downward direction, while that part 17, disposed above the horizontal axis is of other than parabolic curve form whereby the rays of light from the bulb 16 are also reflected in a downward direction. This disposition of reflector with upper and lower reflecting surfaces of differing characteristics constitutes a means having provision for the fixed control of the light rays, it being understood that it is practically impossible to focus the parabolic reflector commonly employed, so as to prevent the upward reflection of a part of the light rays.

Bulb 16 is disposed in a socket 18 slidably arranged along the axis of the reflector in a tube 19, whereby the light may be focused with respect to the reflector, and said bulb is adapted to be maintained in set position by means of set screw 20 threaded in tube 19. Flexible connecting leads 21 serve to connect the terminals of the bulb 16 and said leads, as here shown, extend through a bushing 22 in the outer lamp shell 10 to an external current source. The reflector may be considered to be the source of light for the search light.

The bearings, by means of which the reflector is pivotally mounted with respect to the head light, are disposed in a plane at right angles to the axis of the reflector and include the pins 23 secured in diametrically opposed relation on the reflector. Pins 23 are formed with tapered or conical ends, and fit within correspondingly formed recesses in the bearings or standards 24 and 25, which are secured to the shell 10 of the search light. The conical ends of pins 23 are formed with a slightly smaller angle than have the correspondingly tapered seat or bearing portions in the standards 23 and 25, as is shown more clearly in Fig. 5, so that the contact between the pins and the bearings is at the point only. The small spaces 26 between the tapered ends of the pins and their seats are adapted to retain a lubricant which serves to float the pins in their bearings, and, as the pins are adapted to make contact at their points only, to provide a substantially frictionless bearing support for the reflector, whereby said reflector and shell are adapted for independent relative movement.

One of said standards 25 is provided with a block 27 slidably arranged in an annular slot or recess 28 in said standard and in which is disposed the tapered bearing seat for the pins 23. Said block is maintained in contact with said pin 23 by means of a spring 29 and said spring pressed block forms means admitting of the removal or insertion of the reflector from or into the bearings in the head light in that the removal of the reflector is accomplished by so moving said reflector that the spring pressed block is forced farther into its slot thereby permitting the withdrawal of one of said pins 23 from its bearing in standard 24 whereupon the second pin 23 may be withdrawn from its bearing in the block 27 and the reflector removed from the head light. The insertion of the reflector in its bearings is accomplished by the reverse operation.

The tapered bearing surfaces in the standards 24 and 25 are disposed at the end of concentrically arranged recesses therein and are adapted to surround the ends of pins 23 to restrain said pins from displacement from their bearings by the shocks to which the search light may be subjected and said recesses are of a diameter greater than the pins 23 in order that said pins may not be in contact with the walls of said recesses and cause increased resistance to relative motion thereby. The spring 29 is made of sufficient strength to be uncompressed by said shocks to release the reflector from its bearings. The spring pressed bearing formed by the block 27 also provides a recess whereby any wear in the bearings is continually compensated for and the pins 23 maintained in constant contact with its bearings.

A weight 31, here shown as of triangular shape, is secured by soldering, or riveting, or by other means, to the under side of the reflector and said weight is of such mass, and disposed on the reflector in such a position, with respect to the bearings, that said weight acting in conjunction with the weight of the reflector tends to maintain said reflector in a predetermined position regardless of a movement of the head light; although the bearings may be so disposed that the disposition of the mass of the reflector alone may be sufficient for this purpose.

In order to prevent the contact of the edge of the reflector with the shell, limit stops are provided and said stops comprise flanged members 37 adapted to be secured to the shell 10 and provided with threaded openings 38 therein in which the stop members 39 are adjustably threaded. The head portion of each member 39 is formed with a recess 40 in which is fitted a resilient block 41 and which is adapted to receive the shocks of impact of the reflector in an extreme relative movement of reflector and shell.

The disposition of the reflector with respect to the shell of the head light is such that the horizontal axes of the search light and reflector coincide. When however, the head light is so moved that its axis is displaced from the horizontal plane to some position such as indicated by the dotted lines in Fig. 1, the relation of the center of mass of the reflector and the pivotal support therefor is such that the reflector is undisturbed by such movement and continues to maintain its predetermined position regardless of any movement of the head light to a position away from normal.

We claim:—

1. In combination, in an automobile headlight, an outer shell fixed to the automobile, a reflector inclosed thereby, and a light emitting front plate in the outer shell, all arranged to direct rays of light downwardly onto the roadbed, means pivotally connecting the reflector with the shell admitting of its unrestricted movement within limits and adjustable means to limit the free relative movement between said shell and reflector, and means to automatically maintain the rays of light downwardly directed onto the roadbed as the automobile passes thereover.

2. In combination, an automobile headlight, an outer shell fixed to the automobile, a reflector received therein, and a light emitting front plate in the outer shell, all arranged to direct rays of light downwardly onto the road bed, means pivotally connecting the reflector with the shell admitting of its unrestricted movement within limits, means to limit the free relative movement between said shell and reflector, and means automatically to maintain the rays of light downwardly directed onto the road bed as the automobile passes thereover comprising a weight attached to said reflector beneath its pivotal support.

In testimony whereof we have signed our names to this specification in the presence of two subscribing witnesses.

RALPH H. HOLMAN.
JOHN MacGREGOR.

Witnesses:
H. B. DAVIS,
T. T. GREENWOOD.